United States Patent [19]
Pressman et al.

[11] Patent Number: 5,859,756
[45] Date of Patent: Jan. 12, 1999

[54] AUTOMATIC POWER LINE MONITOR AND CONTROLLER SYSTEM

[76] Inventors: Stanton L. Pressman, 7086 Dassett Ct., #201, Annandale, Va. 22033; Patrick C. Stuart, 101 Rainbow Dr., #1406, Livingston, Tex. 77351

[21] Appl. No.: 704,351

[22] Filed: Aug. 28, 1996

Related U.S. Application Data

[63] Continuation-in-part of Ser. No. 194,523, Feb. 10, 1994, Pat. No. 5,555,483.
[51] Int. Cl.$^6$ ...................................................... H02H 3/20
[52] U.S. Cl. ............................................. 361/90; 361/18
[58] Field of Search .................................. 361/18, 20, 21, 361/23, 30, 36, 56, 57, 54, 76, 77, 78, 79, 88, 90, 93

[56] References Cited

U.S. PATENT DOCUMENTS

| | | | |
|---|---|---|---|
| 4,462,069 | 7/1984 | Becky | 361/56 |
| 4,587,588 | 5/1986 | Goldstein | 361/54 |
| 4,999,730 | 3/1991 | Pickard | 361/59 |
| 5,367,424 | 11/1994 | Even. | |
| 5,555,483 | 9/1996 | Pressman et al. | 361/90 |

*Primary Examiner*—Ronald W. Leja
*Attorney, Agent, or Firm*—Blank Rome Comisky & McCauley LLP

[57] ABSTRACT

An automatic power line monitor system is disclosed for use in monitoring the electrical voltage supplied to an electrical system or appliance by monitoring the supplied electrical voltage and preventing the supplied electrical voltage from reaching the electrical system or appliance when the supplied electrical voltage is not within a predetermined range and for automatically restoring the supplied electrical voltage to the electrical system or appliance when the supplied electrical voltage is within the predetermined range.

23 Claims, 4 Drawing Sheets

| NOR | | |
|---|---|---|
|  | H | L |
|  | 1 | 0 |
| H | 0 | 0 |
| L | 0 | 1 |

AUTOMATIC POWER LINE MONITOR AND CONTROLLER SYSTEM

CROSS-REFERENCE TO RELATED APPLICATION

This application is a continuation-in-part of U.S. patent application Ser. No. 08/194,523, filed Feb. 10, 1994 and entitled "Automatic Power Line Monitor System", now U.S. Pat. No. 5,555,483.

BACKGROUND OF THE INVENTION

The present invention relates generally to the monitoring of the electrical voltage level available from power lines. More particularly, the present invention relates to a system for preventing electrical voltage from reaching an electrical system or appliance when the monitored electrical voltage is not within a predetermined range.

From time to time, the quality of electrical power provided to consumers by the local electric utility company varies from the 117 volts plus or minus 10% standard. For example, in order to cope with increased electrical loads during peak hours, such as, for example, in the evenings when electrical demand can be very high or during certain times of the year when there is a large demand for air conditioning or electrical heating, the voltage available to consumers can be reduced from the standard value. In particular, electric power utilities have been known to reduce the electrical voltage supplied to industrial users when they are experiencing high peak power usage.

Since most electrical systems and appliances designed for use in the United States are intended for use at the standard voltage of 117 volts, as the voltage varies from that value by more than the design standard deviation of 10%, damage to electrical appliances and systems, such as motors, condensers, microwave ovens and electrical appliances, can occur. In addition, for various reasons, electrical voltage spikes or surges are also unintentionally delivered to consumers. Such voltage spikes or surges can also damage or destroy electrical systems and consumer appliances, such as computers, stereos, microwave ovens, VCRs and the like by applying a voltage to those appliances which is higher than the appliance and/or the components of the appliance is designed to withstand.

One consumer area which is particularly sensitive to power voltage deviation conditions is that of recreational vehicle parks. Typically, such recreational vehicle parks provide spaces for parking recreational vehicles and trailers for a large number of users together with an electrical power outlet for each of the users. A similar set up is also utilized in marinas for boat owners.

Most recreational vehicle parks and marinas were built many years ago when users owned campers and small trailers (or small boats in the case of marinas). Since such recreational vehicle parks and marinas did not run at the same levels of capacity as today and the number of electrical systems and appliances used by such campers and small trailers or small boats was not as great as it is today, the electrical load when such recreational vehicle parks and marinas were designed was not as great as it is today. In addition, the electrical appliances and systems used today oftentimes contain complex electrical circuitry which requires greater voltage regulation.

Much of the time, the voltage provided to each of the users of these recreational vehicle parks and marinas is within the standard range of 117 volts plus or minus 10 percent. At certain times, such as during the peak hours of meal times or when heaters or air conditioners are being used, a great load is placed on the electrical power supply system. At those times, the voltage being supplied to each of the users can fall below that which is safe for use to properly operate recreational vehicle or boat appliances. In order to counter such an effect, some recreational vehicle parks and marinas will raise the voltage supplied to each of the spaces from its local transformer. When that happens and there is no load, that is, when very few recreational vehicles or boats are drawing electrical power, the voltage being supplied to each of the recreational vehicles may exceed the expected voltage range for which the recreational vehicle equipment was designed. In that case, severe damage to the electrical appliances in the recreational vehicle can result.

In order to try to prevent damage to electrical appliances in the recreational vehicles, many recreational vehicles have a voltmeter installed. However, in order to be effective, the voltmeter must be watched all of the time and then the user must take effective action to turn off the voltage being supplied to the recreational vehicle before damage to their electrical appliances, such as air conditioners, televisions, refrigerators, VCRs and converters, occurs. Such an approach is, however, totally unsatisfactory to users to implement.

Although the invention is described herein in connection with its use with recreational vehicles, it should be understood that its use is not to be limited to recreational vehicles and that it can be used to monitor electrical voltage applied to any load.

SUMMARY OF THE INVENTION

In view of the foregoing, it should be apparent that there still exists a need in the art for an apparatus for monitoring the electrical voltage supplied to a recreational vehicle such that it will not allow high or low voltages or voltage surges to enter the electrical system of a recreational vehicle and return the voltage to the recreational vehicle electrical system when the voltage has returned to the appropriate range. It is, therefore, a primary object of this invention to provide an apparatus for monitoring the electrical voltage supplied to a recreational vehicle and for preventing voltages below or above a certain predetermined range from reaching the electrical system of the recreational vehicle which is characterized by simple electronic circuitry and which is easy to install.

More particularly, it is an object of this invention to provide voltage monitoring and regulation for a recreational transportation device having its own on-board electrical system which utilizes simple and reliable electronic circuitry which does not require frequent alignment nor costly components.

Still more particularly, it is an object of this invention to provide a voltage monitoring and control system which monitors all phases of the multi-phase electrical power supplied to it and automatically prevents voltage from passing through it when the voltage becomes too high or too low compared to a predetermined range and allows the power to resume passing through it when the voltage returns to the desired range.

Briefly described, these and other objects of the invention are accomplished by electrical circuitry which provides a dual operational amplifier connected such that a different reference voltage signal is applied to each of the operational amplifiers. A first reference voltage signal acts as the high set point while the second reference voltage signal acts as the low set point. An input signal voltage which is directly linearly proportional to the actual alternating current rms voltage being supplied to the power line monitor is provided as an input signal voltage to the operational amplifier for comparison to the first and second reference signals. When the input voltage signal exceeds either the low or high reference points set by the first and second reference voltage signals, a relay is energized which functions to open a main power relay, thus preventing power from flowing to the recreational vehicle electrical system.

With these and other objects, advantages and features of the invention that may become hereinafter apparent, the nature of the invention may be more clearly understood by reference to the following detailed description of the invention, the appended claims and to the several drawings attached herein.

DETAILED DESCRIPTION OF THE PREFERRED EMBODIMENT

Figure 1:
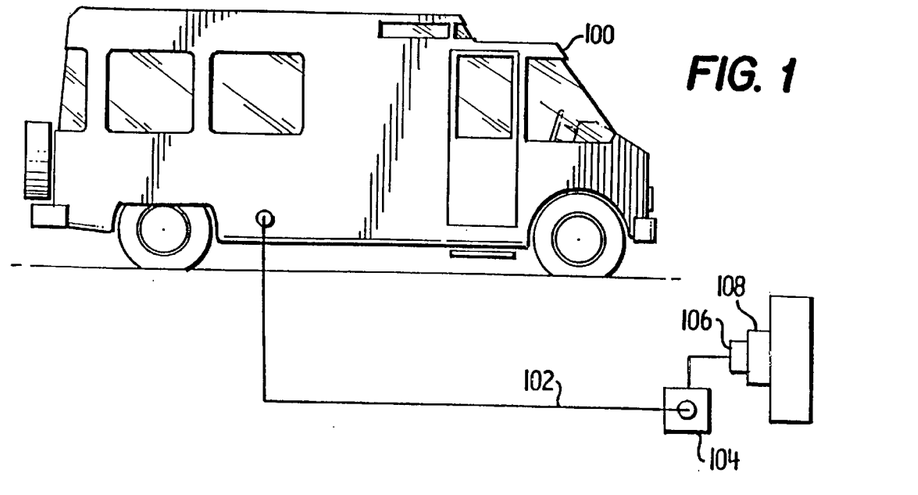
FIG. 1 is a drawing showing the typical use of the apparatus of the present invention in connection with a recreational vehicle.

Referring now in detail to the drawings wherein like parts are designated by like reference numerals throughout, there is illustrated in FIG. 1 a pictorial diagram of a recreational vehicle 100 connected by means of an electrical cord 102 to the power line monitor 104 of the present invention. The power line monitor 104 is connected, upon means of an appropriate connector 106 to the alternating current outlet 108 of, for instance, a recreational vehicle campground.

Figure 2:
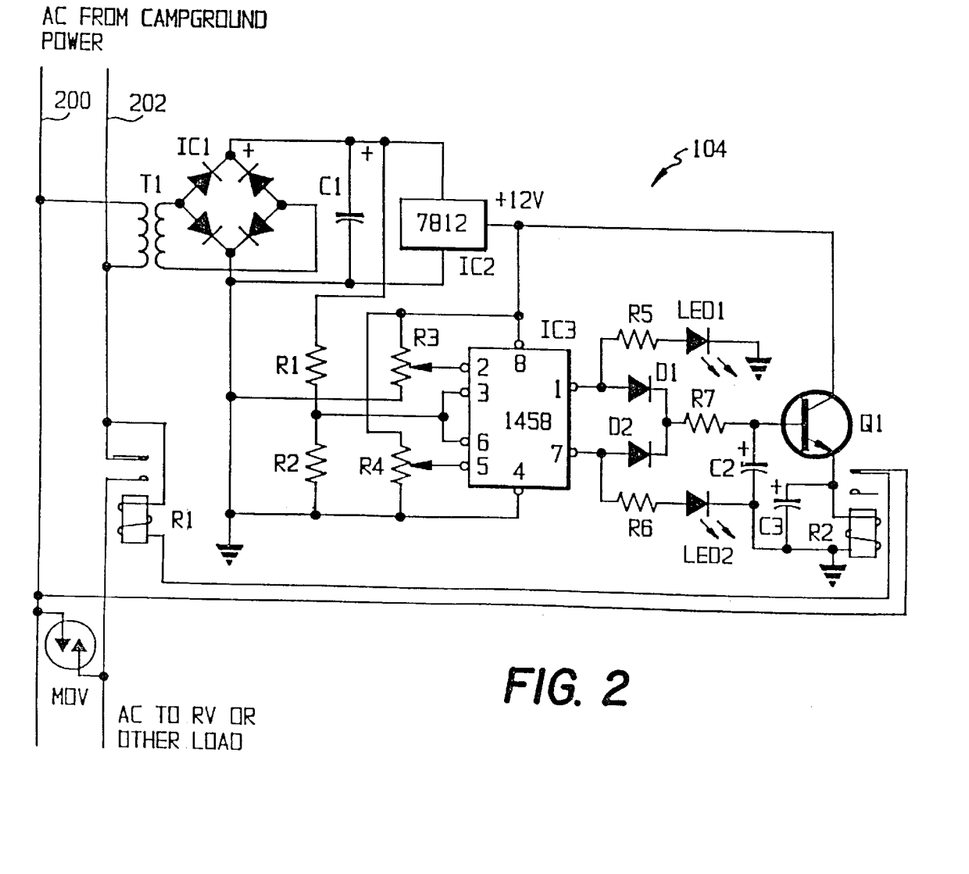
FIG. 2 is a block schematic diagram showing the circuitry of the apparatus of the present invention.

FIG. 2 is an electrical schematic diagram of the circuitry of a first embodiment of the power line monitor 104 of the present invention. As shown in FIG. 2, the power line monitor 104 is connected to the alternating current available from the campground by means of wires 200 and 202. A transformer T1 is connected across the AC wires 200 and 202 to convert the 120 volt, 60 hertz alternating current carried by those two wires 200, 202 to 12.6 volts at its output. The 12.6 volt power is fed to a full wave bridge rectifier IC1 which converts the AC voltage to a DC voltage. The output from the full wave bridge rectifier IC1 is fed to a 12 volt voltage regulator integrated circuit IC2, which may preferably be a model 78M12, available from Motorola of Schaumberg, Ill. A capacitor C1 is connected across the inputs to the voltage regulator IC2 in order to smooth ripples in the DC voltage produced by the full wave bridge rectifier IC1 and to boost the voltage to approximately 16–17 volts DC.

The 12 volts output by the voltage regulator IC2 is supplied as an input to the dual linear op amp integrated circuit IC3, which may preferably be a model MC1458P, available from Motorola or Texas Instruments. A voltage divider network is formed by the two resistors R1 and R2. The resistor R3 is connected between the 12 volt output of the voltage regulator IC2 and the connection of the voltage divider network formed by the resistors R1 and R2 in order to provide a high reference voltage to the integrated circuit 13. Typically, the value of the potentiometer R3 is adjusted such that it represents a high voltage reference of 129 volts.

The potentiometer R4 is connected between the 12 volt output of the voltage regulator IC2 and the end of the resistor R2 which is not connected to the resistor R1. The potentiator R4 is adjusted to provide the low reference voltage typically corresponding to a voltage of 105 volts.

Two diodes D1 and D2 are connected to the output pins of the dual op amp integrated circuit IC3 and the center point of those two diodes D1 and D2 is connected to a resistor R7 which is used to bias the base of a transistor Q1 which functions as the switch for closing the contacts of a relay R2 when a large enough voltage signal is present through either of the diodes D1 or D2. The closing of the relay R2 causes the relay R1 to open, thus breaking the path of the wire 202 to the recreational vehicle which therefore prevents alternating current from reaching the recreational vehicle.

Two LEDs, LED 1 and LED 2, are connected by means of resistors R5 and R6, respectively, to the output terminals of the op amp IC3 to which the diodes D1 and D2 are respectively connected. The resistors R5 and R6 have high enough values to limit the voltage to the LEDs, LED 1 and LED 2, but low enough values to allow those two LEDs to light dimly in order to provide an indication to the RV owner that the power line monitor system 104 is operating. The relay R2 has a capacitor C3 connected between one input of its coil and ground, in order to provide for positive latching of the coil of the relay R2.

Once the two potentiometers R3 and R4 have been properly adjusted, the relay R1 is closed when the power line monitor system 104 is energized and the AC voltage from the RV campground 108 is within the range of 105 to 129 volts. As explained above, under those same conditions, the relay R2 is de-energized.

As the AC line voltage increases across the wires 200 and 202, the secondary voltage output by the transformer T1 also increases. The increased voltage output by the secondary winding of the transformer T1 also increases the signal input voltage to the pins 3 and 6 of the dual op amp integrated circuit IC3. When the signal input voltage applied to the op amp circuit IC3 exceeds the high reference voltage supplied to pin 2 of that integrated circuit, the output of pin 1 of that integrated circuit IC3 goes to 7 volts. That level of voltage causes the LED 1 to conduct after the voltage has been reduced to a usable level through the resistor R5. In addition, the same 7 volt output signal from pin 1 from the dual linear op amp IC3 charges the capacitor C2 through the resistor R7.

The diode D1 protects the dual op amp circuit IC3 from damage due to feedback voltage from downstream components. When the capacitor C2 is fully charged, the voltage from the resistor R7 biases the base of the transistor Q1, causing that transistor Q1 to conduct. Once the transistor Q1 conducts, it energizes the relay R2, which opens the contacts of the relay R1, thus de-energizing the power supplied to the recreational vehicle from the campground power by means of the wires 200 and 202.

As the high alternating current received from the campground power 108 begins to decrease, the signal input voltage through the transformer T1 and the full wave bridge rectifier IC1 to the dual linear op amp circuit IC3 also begins to decrease. When the signal input voltage drops below the high reference voltage, the output at pin 1 of the dual op amp circuit IC3 drops to about 1.5 volts and the LED 1 stops conducting. The capacitor C2 then discharges over a period of approximately 4–5 seconds. When that discharge is complete, the transistor Q1 stops conducting and the relay R2 deenergizes, closing its contacts. When the contacts of the relay R2 are closed, the relay R1 is reenergized, which, in turn, allows the alternating current voltage from the campground power source 108 to reach the recreational vehicle or other load connected to the wires 200 and 202.

In the case where the voltage supplied by the campground begins to decrease, the voltage output by the secondary of the transformer T1 also decreases. That decrease in voltage causes the signal input voltage to pins 3 and 6 of the dual op amp integrated circuit IC3 to decrease. When the signal input voltage to the dual op amp circuit IC3 falls below the value of the low reference voltage applied to pin 5 of the dual op amp circuit IC3, the output at pin 7 of the dual op amp circuit goes to 7 volts. The 7 volts output at pin 7 of the integrated circuit IC3 causes the LED 2 to conduct again after the 7 volts has been reduced to a usable level by means of the resistor R6. The 7 volt signal output from pin 7 of the dual op amp circuit IC3 changes the capacitor C2 through the resistor R7. The diode D2, like the diode D1, serves to protect the dual op amp circuit IC3 from damage due to feedback voltage from the components downstream from the dual op amp integrated circuit IC3.

When the capacitor C2 is fully charged, the voltage through the resistor R7 biases the base of the transistor Q1, causing that transistor Q1 to conduct. Once the transistor Q1 conducts, it energizes the relay R2 which opens its contacts, causing the relay R1 to be de-energized, thus interrupting the power supplied to the recreational vehicle or other load through the wires 200 and 202.

As the AC voltage below 105 volts begins to increase, the signal input voltage supplied to pins 3 and 6 of the dual op amp circuit IC3 likewise increases. When the signal input voltage applied to the operational amplifier IC3 rises above the low reference voltage, the output of pin 7 of the integrated circuit IC3 drops to about 1.5 volts and the LED 2 stops conducting. The capacitor C2 again discharges over a period of about 4–5 seconds. When the discharge of the capacitor C2 is complete, the transistor Q1 stops conducting and the relay R2 is de-energized. When the relay R2 is de-energized, its contacts close and allow the relay R1 to re-energize, which, in turn, allows power to flow from the campground power source 108 to the recreational vehicle or other load through the wires 200 and 202.

Figure 3:
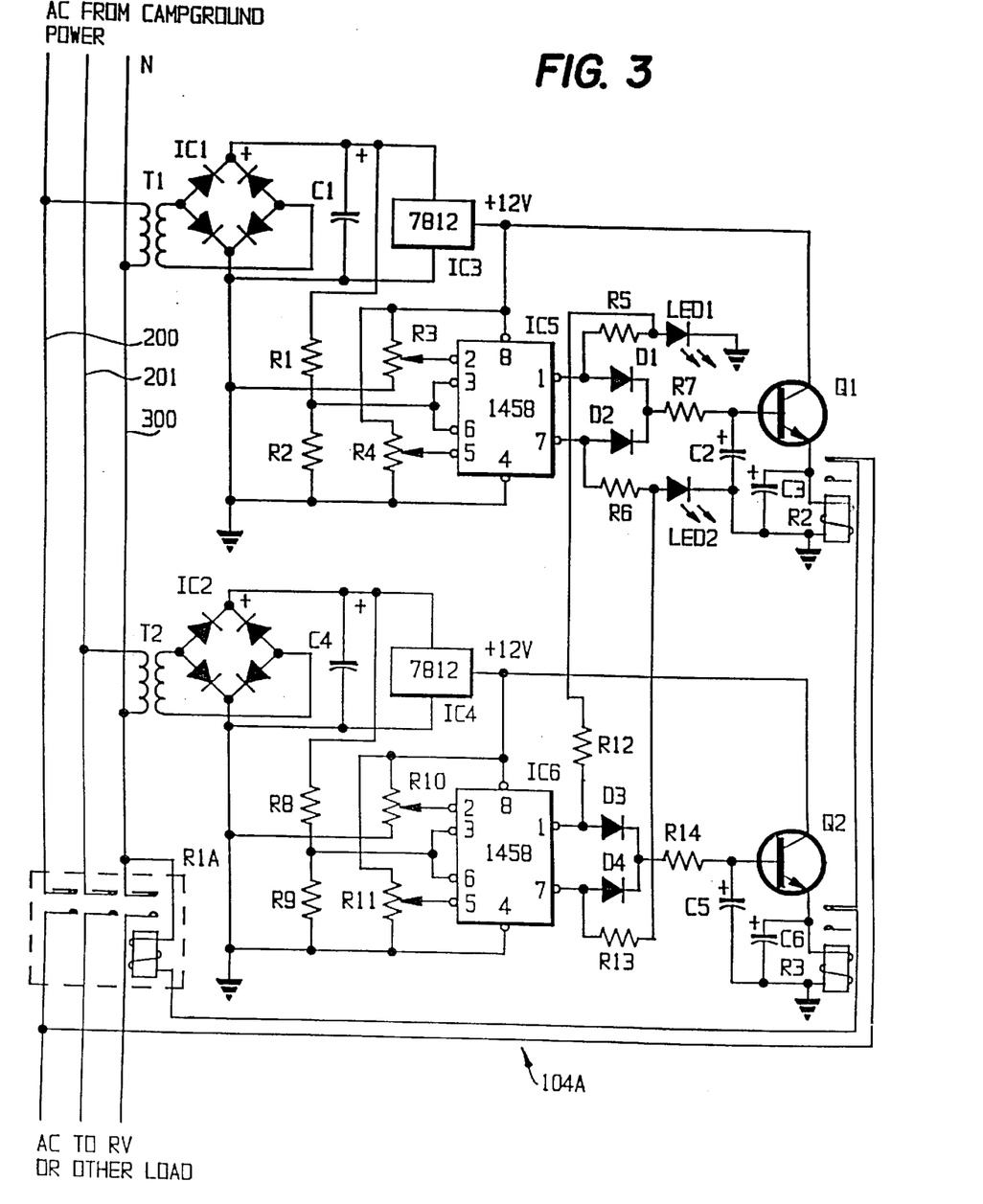
FIG. 3 is a schematic block diagram of the circuitry of an alternate embodiment of the apparatus of the present invention.

Turning now to FIG. 3, there is shown an alternate embodiment of the power line monitor 104A of the present invention which is suitable for use with 50 amp power generally supplied at recreational vehicle campgrounds. Such power is usually supplied from two separate power phases and thus the power line monitor 104A shown in FIG. 3 monitors both power lines for voltage deficiencies.

As shown in the electrical schematic diagram of the alternate preferred power line monitor 104A of FIG. 3, the two line multi-phase power line monitor 104A utilizes two dual operational amplifier integrated circuits IC5 and IC6. Each of the integrated circuits IC5 and IC6 is connected such that a separate reference signal is provided by means of the potentiometers R3 and R4 for the operational amplifier IC5 and potentiometers R10 and R11 for the operational amplifier IC6. The potentiometers R3 and R10 are used to provide the high set point reference voltage and the potentiometers R4 and R11 are used to provide the low set point reference voltage to their respect integrated circuits IC5 and IC6.

In a manner similar to that discussed above in connection with FIG. 2, an input signal voltage which varies proportionally with the output of the secondary of the transformers T1 and T2 is provided respectively to the dual op amp circuits IC5 and IC6. When the signal input to pins 3 and 6 of each of the respective operational amplifier circuits IC5 and IC6 exceeds either the high or the low reference points, a relay R2 or R3 is opened, using the same mechanism discussed above in connection with FIG. 2, which in turn opens the main power relay R1A.

The three-phase power line monitor 104A utilizes a first transformer T1 for monitoring the voltage between the first two-phase line 200 and the neutral line 300 while a second transformer T2 is utilized to monitor the voltage between the second power phase line 201 and the neutral line 300. The relay R1A completes each of the lines 200, 201 and 300 from the campground power to the recreational vehicle or other load. In the event of an over or under voltage condition, the continuity of each of the lines 200, 201 and 300 is broken by means the relay R1A.

In all other respects except for the following exceptions, the circuitry of FIG. 3 operates in the same manner as described above in connection with FIG. 2.

The first difference between the operation of the circuitry of FIG. 3 and that of the circuitry of FIG. 2 is that the LEDs, LED 1, and LED 2 of the power line monitor 104A of FIG. 3 are brightly lit when either of the dual operational amplifier integrated circuits IC5 or IC6 outputs a high or a low indication, respectively. The second exception to the operation of the three-phase power line monitor 104A is that the relays R2 and R3 are connected in series so that any signal input voltage on either of the two lines 200 and 201 which exceeds the high or low reference voltage set points for the integrated circuits IC5 and IC6 will cause power to be interrupted to the recreational vehicle or other load.

Figure 4:
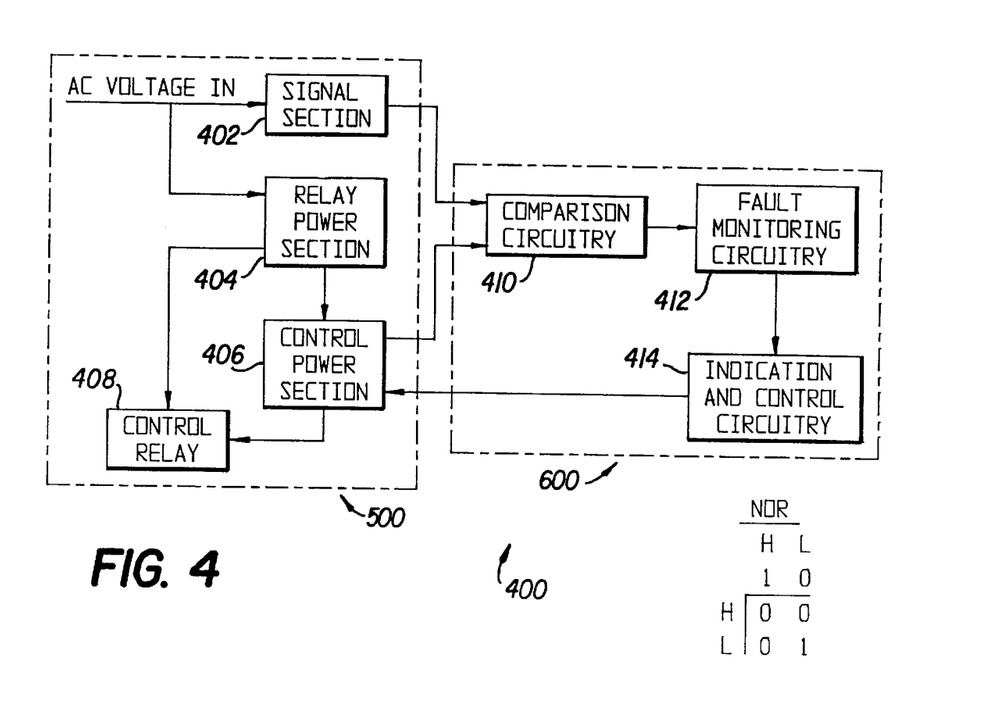
FIG. 4 is a functional block diagram of a second alternate and preferred embodiment of the present invention.
Figure 5:
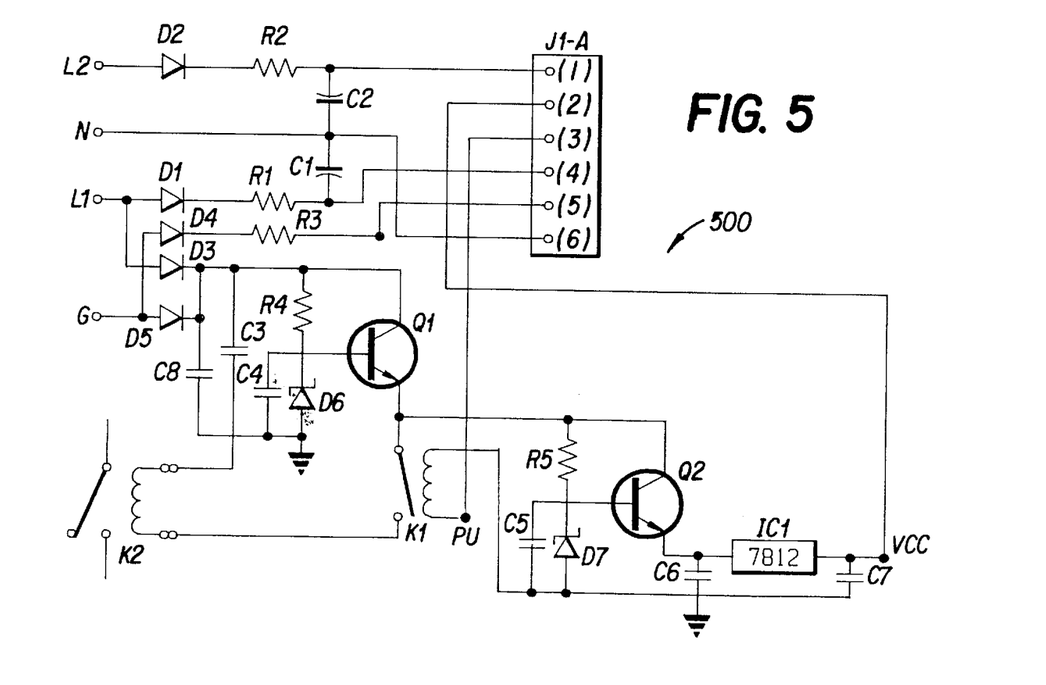
FIG. 5 is a block schematic diagram showing the power circuitry of the second alternate embodiment of the present invention.
Figure 6:
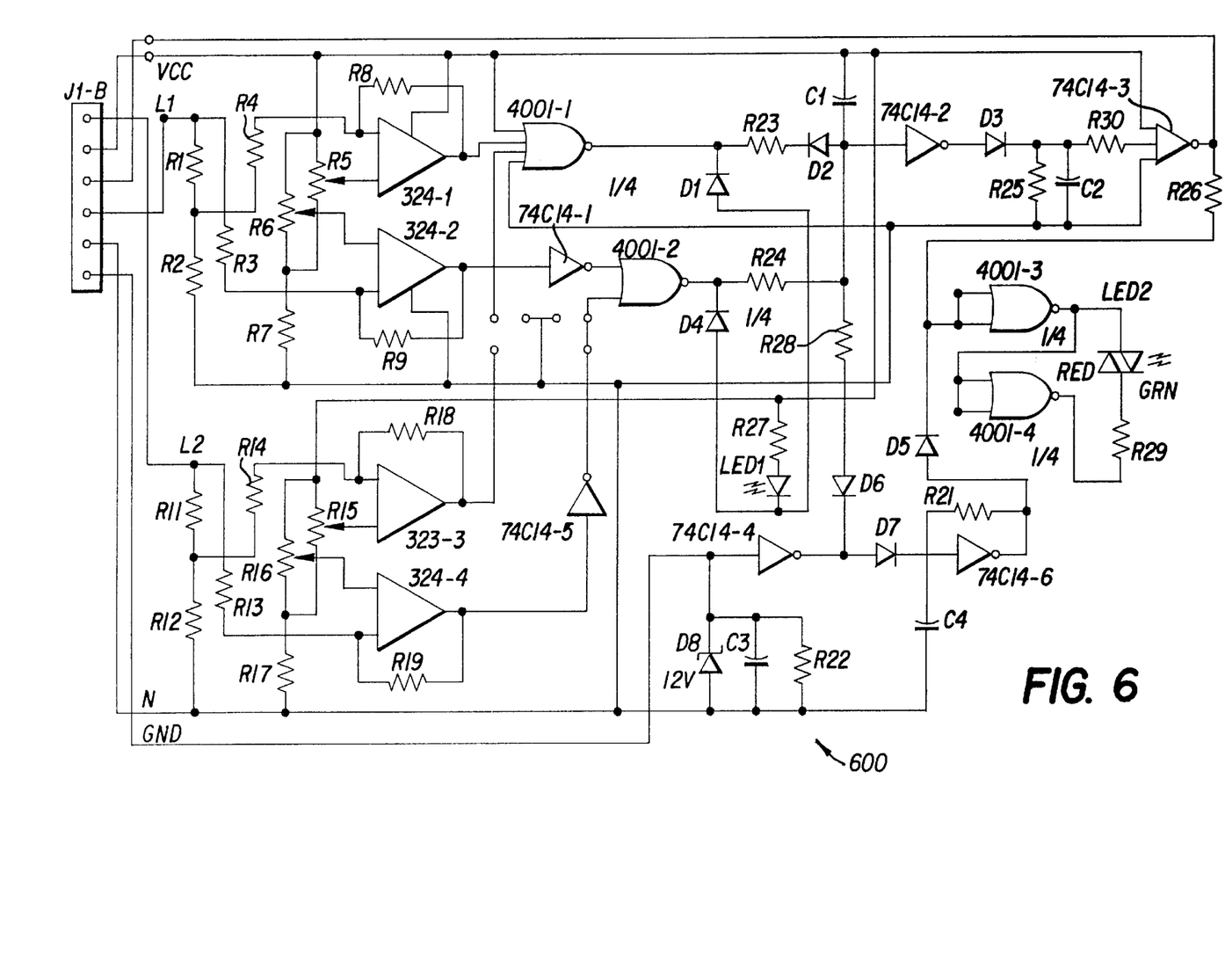
FIG. 6 is a block schematic diagram showing the control circuitry of the second alternate embodiment of the present invention.

Attention is now directed to the second alternate and preferred embodiment of the invention disclosed herein, which is shown in FIGS. 4–6. FIG. 4 shows functional block diagram of the power line monitor and controller 400, which is essentially formed from two components, namely the power circuitry 500, an electrical schematic of which is shown in FIG. 5, and the control circuitry 600, an electrical schematic of which is shown in FIG. 6. The power circuitry 500 consists essentially of a power supply which is connected to the power line 102 and creates the necessary power for operation of the control circuitry 600. The control circuitry 600 monitors for high or low voltage conditions, for surges and for line faults such as reverse power or an elevated voltage on the ground.

The power circuitry 500 is formed from three sections and additionally includes the control relay section. The first section of the power circuitry is the signal section 402, which receives a 120 volt alternating current, half-wave rectified power input and reduces and filters that power input to a direct current voltage that approximates the 120 volt alternating current input level at approximately 1/10 the voltage. That is, 12–13 volts direct current corresponds to 120 volts alternating current. The relay power section 404 of the power circuitry also receives the 120 volt alternating current input power and, using a shunt regulator, reduces that input voltage to a 48 volt DC level for use in controlling the main power relay which forms part of the control relay section 408 of the power circuitry 500. The control relay section also contains the surge suppression device, a series of ganged metal oxide varistors, whose function is to conduct AC voltage, in either direction. When the voltage reaches an internally predetermined set point, the excess voltage is shunted by means of a short circuit, thus preventing damage to components connected later down the line of the power line monitor and controller 400. The relay section also contains the surge suppression device, a series of ganged metal oxide varistors, whose function is to conduct AC voltage, in either direction. When the voltage reaches an internally predetermined set point, shunting the excess voltage by means of a short circuit, thus preventing damage to components down the line of the power line monitor and controller 400. The relay power section 404 of the power circuitry 500 also acts as a first stage for dropping the input power to a useable level. The control power section 406 of the power circuitry 500 is connected to the relay power section 404 and creates a 12 volt DC current for powering the control circuitry 600 from the 48 volt DC voltage it receives from the relay power section 404.

The control circuitry 600 is formed from three components, namely the comparison circuitry 410, the fault monitoring circuitry 412, and the indication and control circuitry 414. The comparison circuitry 410 receives the output from the signal section 402 of the power circuitry 500 as well as the 12 volt direct current output from the control power section 406 of the power circuitry 500. The comparison circuitry 410 monitors those signals for high and low voltage as well as power surges and feeds its output to the input of the fault monitoring circuitry 412. The fault monitoring circuitry 412 functions to sense the polarity of the input signals it receives from the comparison circuitry 410. The output from the fault monitoring circuitry 412 is connected to the input of the indication and control circuitry 414, which functions to control the indication of the operation of the power line monitor and controller 400 as well as to activate the main power relay by means of sending a signal to the control power section 406 of the power circuitry 500.

The operation of the power line monitor and controller 400 will now be described with reference to the electrical schematic diagrams shown in FIGS. 5 and 6 under different operating conditions. Under normal operation, in which no faults occur, the power line 102 is connected to the line 1, line 2 and neutral inputs L1, L2, and N of the power circuitry 500. The voltage which is input via the first line input L1 is rectified by means of the diode D1 and is reduced and filtered by means of the resistor R1 and capacitor C1 combination to provide a signal at pin 4 of the jack J1-A. A ground reference is provided through the resistor 3 to pin 5 of the jack J1-A. The line 1 input also supplies power which is rectified by means of the diode D3. That power is further filtered by the capacitor C3 which is connected to the output of the diode D3. A resistor R4 is used to shunt voltage from the output of the diode D3 to the base of the transistor Q1 while a 48 volt Zener diode D6 connected to the other end of the resistor R4 elevates the ground potential seen by the transistor Q1 to 48 volts. The Zener diode D6 is connected between the base of the transistor Q1 and ground. In that manner, the transistor Q1 is caused to clamp down on the voltage at its collector and to produce a regulated 48 volts DC at its emitter. Thus, the transistor Q1 operates as a shunt regulator.

A first coil K1, which may preferably be a 12 volt direct current coil relay, is used to actuate the main power relay K2 in the control relay section 408 upon receiving a signal from the control circuitry 600 via the control power section 406. The signal received from the control circuitry 600 is received at pin 3 of the jack J1-A. The main contacts of the relay K1 are used to provide the 48 volt direct current power to operate the coil of the main power relay K2.

Power for operating the control circuitry is provided by a shunt regulator configured using the transistor Q2 in a manner similar to that described above in connection with the shunt regulator formed by the transistor Q1 and its connected elements. In that manner, the 48 volt direct current signal produced at the emitter of the transistor Q1 is converted to a 12 volt direct current signal at the emitter of the transistor Q2. The emitter of the transistor Q2 feeds a first integrated circuit IC1, which may preferably be a Model 7812 voltage regulator, which maintains a +12 volt DC (Vcc) to the control circuitry 600.

Turning now to the control circuitry 600 shown in FIG. 6, the resistors R1 and R2 form a voltage divider network which feeds the operational amplifier 324-1 and 324-2 a signal for the high and low signals. The resistors R3 and R4 operate to limit the current supplied to the op amp 324-1 and 324-2. The adjustable resistors R5 and R6 act to set the high and low reference points for the op amp 324-1 and 324-2. The resistors R8 and R9 are used to control the hysteresis (that is, the voltage gap between turn on and turn off points) of the op amp 324-1 and 324-2.

The output of the low voltage monitoring op amp 324-1 is low (at +1.5 volts DC) while the output of the high voltage monitoring op amp 324-2 is high (at +12 volts DC) under normal operating conditions. The output from the low voltage monitoring op amp 324-1 is fed to one input of a two input NOR logic gate 4001-1. The output from the high voltage monitoring op amp 324-2 is inverted by being fed to a schmitt trigger IC 74C14-1 first and then is fed to one input of a second two-input NOR logic gate 4001-2. The other input of each of the NOR gates 4001-1 and 4001-2 is connected to ground. When additional lines of voltage are to be measured, such as line L2 in FIG. 6, a similar resistor network with corresponding op amps can be attached to the inputs of 4001-1 and 4001-2, adding these circuits to the fault monitoring circuitry 412 and the indication and control circuitry 414. Since the NOR gate requires a minimum of two inputs, unused inputs must be connected to ground. In addition, when adding more than 3 comparison circuitry sections 410, the NOR gate type must be changed to accept the additional inputs. Assuming the two remaining inputs are made low inputs and applied to the NOR gate 4001-1, it produces a high output. That creates a low voltage at the cathode of the diodes D1 and D2, which prevents the NOR gate 4001-1 from acting as a sink for current. The two-input NOR gate 4001-2 receives a low signal from the schmitt trigger 74C14-1 and a low signal from having the other input sunk to low. The two low inputs on the NOR gate 4001-2 produce a high signal at the output of that NOR gate.

The output from the NOR gate 4001-2 is fed to the schmitt trigger IC 74C14-2, which causes the signal to go low. The output from the schmitt trigger 74C14-2 is fed to the anode of the diode D3 and from there to the input of a third schmitt trigger 74C14-3, which makes that signal go high again. That circuitry performs two functions. First, the two-NOR logic gate 4001-3 receives two high signals and therefore outputs a low signal to the inputs of a fourth two-input NOR logic gate 4001-4, which itself outputs a high signal. That causes the LED 2 to be polarized such that the green portion of that red/green LED is energized. Secondly, the third schmitt trigger 74C14-3, produces a high output. This output is sent through pin 3 of the connection J1-B to the control power section 406 which energizes the main power relay K2 in the control relay section 408 of the power circuitry 500.

The resistor R23 controls the delay between the indication of the high voltage condition and the de-energizing of the main relay K2. The resistor R24 is used to control the delay between the indication of a low voltage and the drop out of the main relay K2. The resistor R25 and the capacitor C2 form an RC time delay constant which determines the time relay between when the voltage returns to normal and when the main power relay K2, energizes.

Similar circuitry with respect to the resistors R1–R9 and the op amps 324-1 and 324-2 as well as the schmitt trigger 74C14-1 is provided by the elements R11–R19, op amps 324-3—324-4 and the schmitt trigger 74C14-5 in connection with the monitoring of the voltage on line 2 L2. The output from that circuitry is connected to the input of the NOR gates 4001-1 and 4001-2, from the op amps 324-3 and 324-4 respectively, and functions as described previously. If not used, the inputs of the op amps are sunk to ground.

When a high voltage is sensed, for example, the line L1, the power circuitry 500 continues to operate as described above in connection with the normal operation in which no faults, high or low voltage have been detected. The control circuitry of FIG. 6, however, operates as follows. The resistors R1 and R2 form a voltage divider network which feeds the op amp 324-1 and 324-2 a signal representative of the high and low signals. The resistors R3 and R4 function as current limiting resistors for the op amp 324-1 and 324-2. The adjustable resistors R5 and R6 act to set the high and low reference points for the op amp and the resistors R8 and R9 act to control the hysteresis of the op amp 324-1 and 324-2. The output of the low voltage monitoring op amp 324-1 is again low while the output of the high voltage monitoring op amp 324-2 is again high, as under normal conditions. The output from the op amp 324-1 is fed to a two-input NOR gate 4001-1 while the output from the op amp 324-2 is fed to the input of another two-input NOR gate 4001-2, but is first inverted by the schmitt trigger 74C14-1. The other input to each of the two-input NOR logic gates 4001-1 and 4001-2 is sunk to ground, in this case considering only the voltage on line L1.

The NOR gate 4001-1, having two low inputs, produces a high output. That high output creates a low voltage at the cathodes of the diodes D1 and D2, which prevents the NOR gate 4001-1 from acting as a sink for current. When the high voltage set point is reached, the output of the op amp 324-2 goes low. Thus, the NOR gate 4001-2 receives a high input signal from the schmitt trigger 74C14-1 and a low input signal from having its other input sunk to ground. Thus, having a high and a low on its two inputs, the NOR gate 4001-2 produces a low output. Current thus flows through the resistor R27 and the LED 1 and diode D4 to the low voltage potential of the output of the NOR gate 4001-2, causing the LED 1 to energize red.

The low at the output of the NOR gate 4001-2 is sensed by the schmitt trigger 74C14-2, which in turn causes that schmitt trigger to go high through the diode D3 where it is sensed on the input to the third schmitt trigger 74C14-3, making that schmitt trigger go low. That in turn causes two operations to occur. First, the third two-input NOR logic gate 4001-3 receives two low signals and thus produces a high signal at its output which is then fed to the inputs of a fourth two-input NOR logic gate 4001-4, which, in turn, produces a low level signal at its output. That causes the polarization of the LED 2, such that the red portion of that red/green LED is energized. Secondly, the third schmitt trigger 74C14-3, which is low, causes the main power relay K2 to de-energize by means of its connection to the terminal 3 of the jack J1-B, via the control power section 406 and the control relay section 408.

The circuitry of FIG. 6 operates to sense a low voltage condition on the line L1 as follows. The resistors R1-R9 perform the same functions as described above in connection with the high voltage operation of the control circuitry 600. In addition, the normal condition outputs of the low voltage and high voltage monitoring op amps 324-1 and 324-2 are likewise the same. The output from the low voltage monitoring op amp 324-1 is fed to one of the inputs of the logic gate 4001-1 while the output from the high voltage monitoring op amp 324-2 is first inverted by a first schmitt trigger 74C14-1 and then input to one of the inputs of a second logic gate 4001-2. As previously described, the other input to each of the NOR logic gates 4001-1 and 4001-2 is sunk to ground, considering only the voltage applied to line L1. However, when the low voltage set point of the low voltage monitoring op amp 324-1 is reached, the output of that op amp 324-1 goes high. Thus, the NOR gate 4001-1 receives one high and one low input and therefore generates a low level output. That low level output creates a low level voltage at the cathodes of the diodes D1 and D2, which makes the NOR gate 4001-1 act as a sink for current. The second NOR logic gate 4001-2 receives a low level input from the first schmitt trigger 74C14-1 as well as a low level input from having its other input sunk to the low level. Those two low level signals cause the output of the second NOR logic gate 4001-2 to produce a high level signal. Thus, current flows through the resistor R27 and the LED 1 and diode D1 combination, to the low level at the output of the first NOR logic gate 4001-1, causing the LED 1 to energize red. When the LED 1 energizes red, it indicates that a high or low voltage condition has been sensed by the control circuitry 600.

The low level condition at the NOR gate 4001-2 is sensed by the second schmitt trigger 74C14-2 which in turn causes that schmitt trigger to go high, through the diode D3. The output signal from the diode D3 is sensed on the input of the third schmitt trigger 74C14-3, causing that schmitt trigger to go low. That in turn causes two operations. First, the third NOR logic gate 4001-3 receives two low level signals and thus outputs a high level signal to the inputs of the fourth NOR logic gate 4001-4, which outputs a low level signal. That causes the LED 2 to polarize such that the red portion of the red/green LED 2 is energized. Secondly, the third schmitt trigger 74C14-3, which is at a low level, de-energizes the main power relay K2 through the third contact of the jack J1-B via the control power section 406 and the control relay section 408.

Although the previous description may seem to imply that the indication and deenergization of the main power relay K2 are simultaneous, such is not the case. The LED 1 indication is instantaneous when either a high or low AC voltage is present. The LED 2 indication is delayed, as controlled by the resistor R23 or the resistor R24, for high or low voltage, respectively.

The power line monitor and controller 400 also indicates whether an elevated voltage on ground that is, a fault condition, has occurred. Such fault condition may exist, for example, in such instances as a ground fault, improper polarity or misconnected wiring. Under normal conditions, a proper ground causes a low input to the fourth schmitt trigger 74C14-4 of the control circuitry 600 to output a high level signal through the diode D7. The cathode of the diode D7 is connected to the input of a sixth schmitt trigger 74C14-6, which inverts that high level signal to a low level signal which is seen at the anode of the diode D5, which will not conduct through that diode D5 and affect the indication of the red/green LED 2.

However, when it is determined that the ground has reached a potential higher than the threshold of the fourth schmitt trigger 74C14-4, it is clamped at 12 volts by a 12 volt Zener diode D8 and the output of the fourth schmitt trigger 74C14-4 goes low. That also forces the input to the second schmitt trigger 74C14-2 to go low, causing the output of that schmitt trigger to go high. That happens because the output of schmitt trigger 74C14-4, which is now a sink, is connected to the input of schmitt trigger 74C14-2 via diode D6 and resistor R28. The output from the second schmitt trigger 74C14-2 is fed through the diode D3 to the input of the third schmitt trigger 74C14-3. Thus, the output from the third schmitt trigger 74C14-3 goes low, and de-energizes the main power relay K2, again through the third contact in the jack J1-B via the control power section 406 and the control relay section 408.

The low level signal from the fourth schmitt trigger 74C14-4 is also applied through the diode D7 to the sixth schmitt trigger 74C14-6, which causes it to produce a high level signal. The capacitor C4 is then charged at a rate controlled by the resistor R21 from the sixth schmitt trigger 74C14-6 and discharges through the resistor R22 to the base of the fourth schmitt trigger 74C14-4. The net affect of that operation is to cause the anode of the diode D5 to change its voltage level from high to low, again at a rate set by the value of the resistor R21. Such an oscillation in the voltage causes the red/green LED 2 to switch colors between red and green. The alternating red/green light indicates a fault condition.

Although the operation of the power line monitor and controller 400 has primarily been described in connection with monitoring a single line L1 of the electrical cord 102, it is connected, as shown in FIGS. 5 and 6, to both lines L1 and L2, as well as the neutral and a ground. Thus, through the circuitry shown in FIGS. 5–6, it functions to monitor both of the lines L1 and L2, in a manner similar to that described above in connection with the monitoring of the single line L1, as well as the neutral and ground. In addition, as many lines of voltage as may be necessary or desirable to monitor may be connected by adding additional comparison circuitry 410 to a NOR gate with the appropriate number of inputs (i.e., 3 phases of power would require 3 comparison circuits 410 with a double, 3 input NOR gate 4000 to replace the NOR gate 4001-1 and NOR gate 40001-2).

Although the power line monitor 104, 104A and power line monitor and controller 400 of the present invention have been described as systems which are added after the recreational vehicle has been manufactured, it should be understood that similar circuitry can be hot wired or built directly into a recreational vehicle or other vehicle such that it need not be added later on. In that event, a remote indicating panel containing the LED 2, the red/green LED, is provided for mounting inside the recreational vehicle, while the LED 1 remains inside the device enclosure as an alternate local means of indication for calibration so that the operation of the power line monitor can be monitored. In all other respects, a hard wired power line monitor operates in exactly the same fashion as the power line monitor 104, 104A and 400 which is plugged into the campground power source 108 and to which the recreational vehicle 100 is then connected by means of a power line 102.

Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. A power line monitor system for use with a recreational vehicle for connecting the electrical system of such recreational vehicle to a source of electrical power, comprising:
   means for connecting said power line monitor system to said source of electrical power;
   means for connecting said electrical system of said recreational vehicle to said power line monitor system;
   means for monitoring said source of electrical power to determine whether voltage supplied by said source of electrical power is within a predetermined voltage range;
   means for indicating electrical power outside of said predetermined voltage range including at least one indicating means connected to indicate a condition wherein the voltage is at least one of higher and lower than said predetermined voltage range, and wherein, during said condition wherein the voltage is at least one of higher and lower than said predetermined voltage range, said at least one indicating means is enabled prior to interruption of said electrical system and disabled prior to restoration of said connection of said recreational vehicle to said source of electrical power; and
   means for interrupting connection of the electrical system of said recreational vehicle to said source of electrical power while said voltage supplied by said source of electrical power is outside of said predetermined voltage range and for automatically restoring connection to said electrical system of said recreational vehicle when said voltage is within said predetermined voltage range, said means for interrupting including at least two switching means, wherein a first switching means controls a second switching means for interrupting and automatically restoring connection of said electrical power to said electrical system of said recreational vehicle.

2. The power line monitor system of claim 1, further including means for providing voltage surge protection for said electrical system of said recreational vehicle.

3. The power line monitor system of claim 1, wherein said means for monitoring comprises means connected to monitor each phase's voltage of electrical power supplied by said source of electrical power such that said means for interrupting prevents electrical power from said source of electrical power from reaching said electrical system of said recreational vehicle while any phase's voltage of said electrical power supplied by said source of electrical power is outside of said predetermined voltage range.

4. The power line monitor system of claim 1, wherein said source of electrical power is an electrical power outlet of one of a recreational vehicle campground, marina, and trailer park.

5. The power line monitor system of claim 4, wherein said means for monitoring said source of electrical power is situated adjacent to and removably connected with said electrical power outlet.

6. The power line monitor system of claim 1, wherein said means for monitoring said source of electrical power is permanently mounted to said recreational vehicle.

7. The power line monitor system of claim 1, wherein said means for interrupting connection of said electrical system of said recreational vehicle to said source of electrical power is contained within said power line monitor system.

8. The power line monitor system of claim 1, wherein said at least one indicating means includes different indicating means for indicating a higher or lower voltage condition.

9. A method for monitoring the value of the electrical voltage supplied to the electrical system of a transportation vehicle from an outside source of electrical power for preventing damage to the electrical system of the transportation vehicle, comprising the steps of:

connecting means for monitoring the value of the electrical voltage supplied to the electrical system of a transportation vehicle from said outside source of electrical power between said electrical system of said transportation vehicle and said outside source of electrical power;

monitoring the value of said electrical voltage supplied to the electrical system of said transportation vehicle by said outside source of electrical power to determine when said value is outside of a predetermined voltage range of values;

indicating when said electrical voltage is outside of said predetermined voltage range utilizing at least one indicating means connected to indicate a condition wherein the voltage is at least one of higher and lower than said predetermined voltage range, and wherein, during said condition wherein the voltage is at least one of higher and lower than said predetermined voltage range, said at least one indicating means is enabled prior to preventing said electrical power from reaching the electrical system of said transportation vehicle and disabled prior to restoring said electrical power from said outside power source to said electrical system of said transportation vehicle; and     preventing electrical power from said outside source of electrical power from reaching the electrical system of said transportation vehicle while said value of said electrical voltage supplied by said outside source of electrical power is outside of said predetermined voltage range and automatically restoring electrical power from said outside source of electrical power to said electrical system of said transportation vehicle when said value of said electrical voltage is within said predetermined voltage range, said step of preventing utilizing at least two switching means, wherein a first switching means controls a second switching means for preventing and automatically restoring electrical power from said outside source of electrical power to said electrical system of said transportation vehicle.

10. The method of claim 9, wherein said step of monitoring includes monitoring each phase's voltage of said electrical voltage supplied by said outside source of electrical power.

11. The method of claim 9, further including the step of providing voltage surge protection for said electrical system of said transportation vehicle.

12. The method of claim 9, wherein said transportation vehicle comprises a recreational vehicle and said outside source of electrical power is an electrical power outlet of one of a recreational vehicle campground and a trailer park.

13. The method of claim 12, wherein said means for monitoring the value of said electrical voltage supplied to said electrical system of said transportation vehicle is connected to said electrical power outlet.

14. The method of claim 9, wherein said means for monitoring the value of said electrical voltage supplied to said electrical system of said transportation vehicle is mounted in said transportation vehicle.

15. The method of claim 9, wherein said step of preventing electrical power from outside said outside source of electrical power from reaching the electrical system of said transportation vehicle is accomplished within said means for monitoring.

16. The method of claim 9, wherein said at least one indicating means includes different indicating means for indicating a higher or lower voltage condition.

17. A power line monitor system for connection between an external source of electrical power and a load for monitoring the value of the voltage supplied by the external source of electrical power, comprising:

means for connecting said power line monitor system to said external source of electrical power;

means for connecting said load to said power line monitor system;

means for monitoring the voltage value of said external source of electrical power to determine whether voltage supplied by said external source of electrical power is within a predetermined voltage range;

means for indicating electrical power outside of said predetermined voltage range including at least one indicating means connected to indicate a condition wherein the voltage is at least one of higher and lower than said predetermined voltage range, and wherein, during said condition wherein the voltage is at least one of higher and lower than said predetermined voltage range, said at least one indicating means is enabled prior to interruption of said source of electrical power to said load and disabled prior to restoration of said connection of said load to said source of electrical power; and     means for interrupting connection of said load to said external source of electrical power while said voltage supplied by said external source of electrical power is outside of said predetermined voltage range and for automatically restoring connection of said load to said external source of electrical power when said voltage supplied by said external source of electrical power is within said predetermined voltage range, said means for interrupting including at least two switching means, wherein a first switching means controls a second switching means for interrupting and automatically restoring connection of said electrical power to said load.

18. The power line monitor system of claim 17, wherein said means for interrupting connection of said load to said external source of electrical power is contained within said power line monitor system.

19. The power line monitor system of claim 17, further including means for providing voltage surge protection for said load.

20. The power line monitor system of claim 17, wherein said means for monitoring comprises means connected to monitor each phase's voltage of electrical power supplied by said external source of electrical power to said load such that said means for interrupting prevents electrical power from said external source of electrical power from reaching said load while any voltage phase of said external source of electrical power supplied to said load is outside of said predetermined voltage range.

21. The power line monitor system of claim 17, wherein said at least one indicating means includes different indicating means for indicating a higher or lower voltage condition.

22. A power line monitor system for use with a recreational vehicle for connecting the electrical system of such recreational vehicle to a source of electrical power, comprising:

means for connecting said power line monitor system to said source of electrical power;

means for connecting said electrical system of said recreational vehicle to said power line monitor system;

means for monitoring said source of electrical power to determine whether voltage supplied by said source of electrical power is within a predetermined voltage range;

means for indicating electrical power outside of said predetermined voltage range including at least one indicating means connected to indicate a condition wherein the voltage is at least one of higher and lower than said predetermined voltage range, and wherein, during said condition wherein the voltage is at least one of higher and lower than said predetermined voltage range, said at least one indicating means is enabled prior to interruption of said electrical system and disabled prior to restoration of said connection of said recreational vehicle to said source of electrical power; and means for interrupting connection of the electrical system of said recreational vehicle to said source of electrical power while said voltage supplied by said source of electrical power is outside of said predetermined voltage range and for automatically restoring connection to said electrical system of said recreational vehicle when said voltage is within said predetermined voltage range, said means for interrupting including at least one switching means for interrupting and automatically restoring connection of said electrical power to said electrical system of said recreational vehicle.

23. A power line monitor system for use with a recreational vehicle for connecting the electrical system of such recreational vehicle to a source of electrical power, comprising:

means for connecting said power line monitor system to said source of electrical power;

means for connecting said electrical system of said recreational vehicle to said power line monitor system;

means for monitoring said source of electrical power to determine whether voltage supplied by said source of electrical power is within a predetermined voltage range;

means for monitoring said source of electrical power to determine whether the polarity of the voltage supplied by said source of electrical power is correct; and means for interrupting connection of the electrical system of said recreational vehicle to said source of electrical power while said voltage supplied by said source of electrical power is at least one of outside said predetermined voltage range and of incorrect polarity.

* * * * *